Dec. 14, 1926.  
L. W. EGGLESTON  
SNAP VALVE  
Filed Sept. 2, 1921  
1,610,500  
2 Sheets—Sheet 1
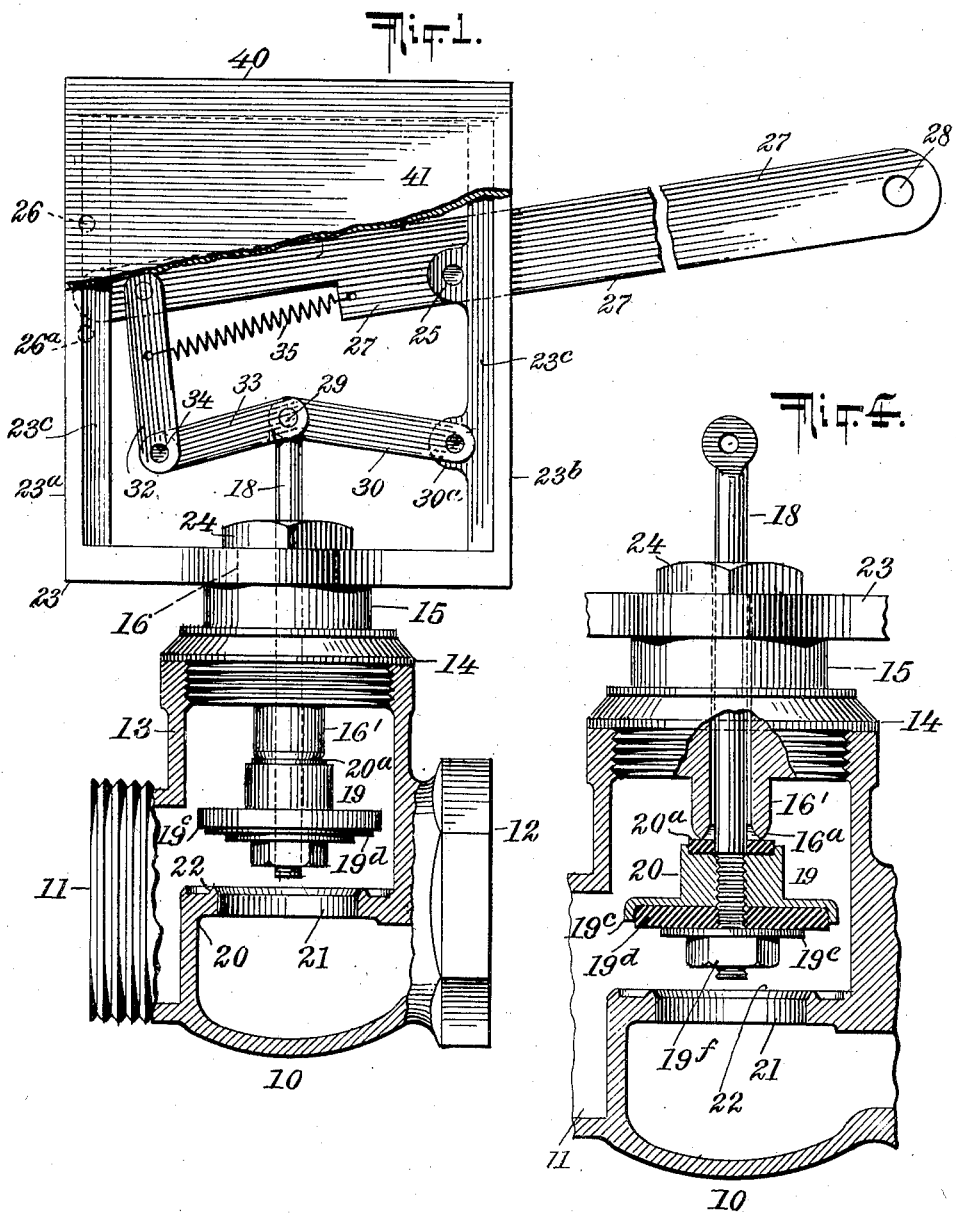

Dec. 14, 1926.
L. W. EGGLESTON
SNAP VALVE
Filed Sept. 2, 1921
1,610,500
2 Sheets-Sheet 2
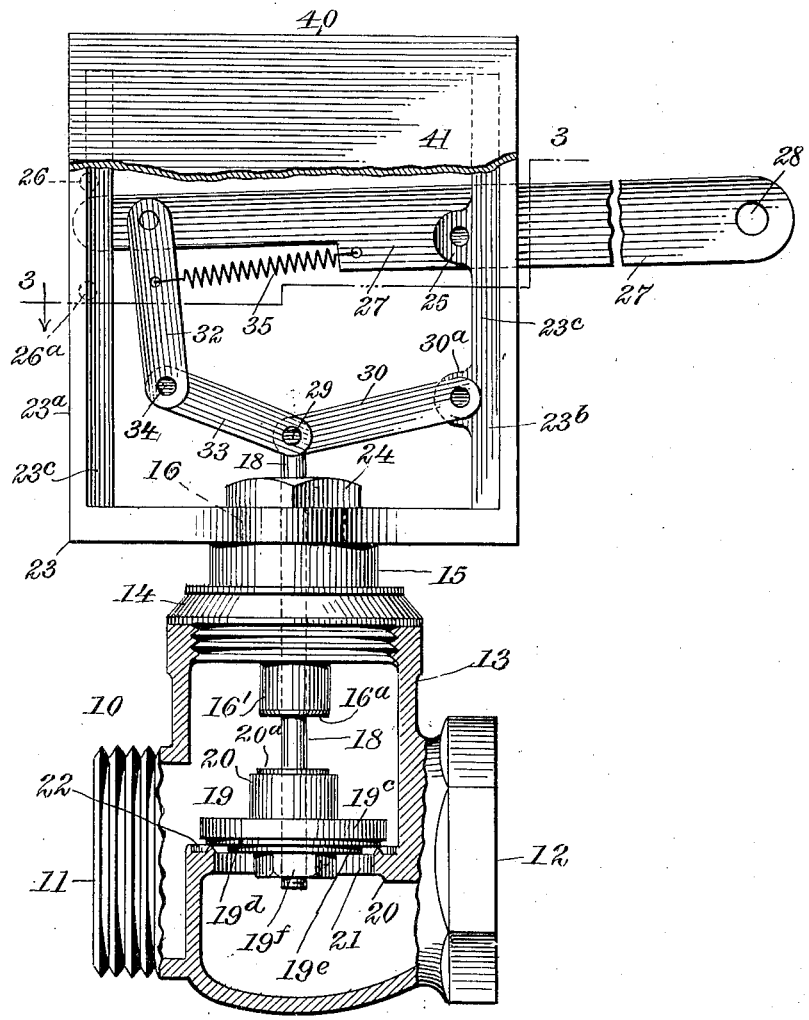
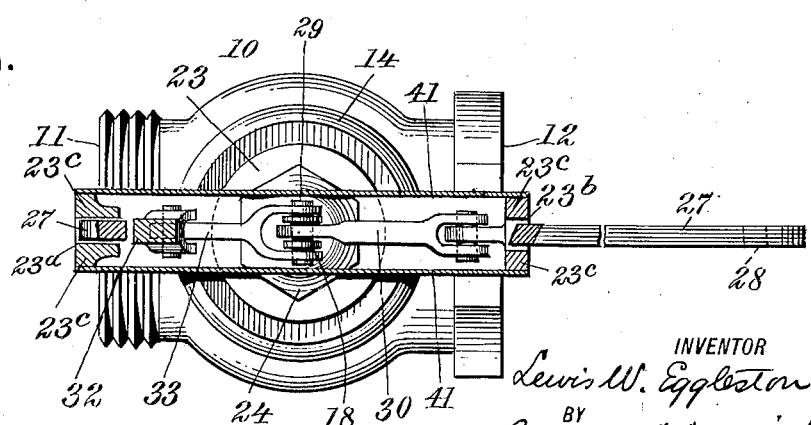
INVENTOR
Lewis W. Eggleston
BY
Conrad A. Dieterich
his ATTORNEY

Patented Dec. 14, 1926.

1,610,500

UNITED STATES PATENT OFFICE.

LEWIS W. EGGLESTON, OF BUFFALO, NEW YORK, ASSIGNOR TO AMERICAN RADIATOR COMPANY, OF CHICAGO, ILLINOIS, A CORPORATION OF NEW JERSEY.

SNAP VALVE.

Application filed September 2, 1921. Serial No. 498,052.

My invention relates to improvements in means for controlling the flow of fluids through pipes, containers and other receptacles, and the same has for its object to provide a valve which is quick in action and positive in operation.

Further, said invention has for its object to provide a valve adapted for use in connection with gases or mixtures thereof, which when mixed with a certain percentage of air become explosive, and liable to injure the apparatus in connection with which such gases are used.

Further, said invention has for its object to provide a valve which may be automatically operated, for example, by an apparatus responsive to pressure or temperature variations, and when so operated respond instantly to the action of such automatically operative apparatus.

Further, said invention has for its object to provide a simple, efficient and reliable valve which when actuated will open or close substantially instantaneously so as to prevent an accumulation of gas which would be liable to cause back-firing or an explosion.

Further, said invention has for its object to provide a valve of the character specified having means for effectually preventing the leakage of gas therefrom when the valve which controls the passage of the fluid therethrough is unseated.

Other objects will in part be obvious, and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawing, showing an illustrative embodiment of the invention, Figure 1 is a side elevation, partly broken away, showing one form of valve constructed according to and embodying my said invention; the valve face being shown raised from its seat;

Fig. 2 is a similar view showing the valve closed upon its seat;

Fig. 3 is a horizontal sectional view taken on the line 3—3 of Fig. 2, and

Fig. 4 is an enlarged vertical, central section showing the main and secondary valve constructions.

In said drawings 10 designates a valve casing which may be of any desired construction, and is herein shown as of the globe type having an outlet opening 11, and an inlet opening 12. From the upper portion of said casing 10 extends a neck portion 13 which is sealed by a screw cap or head 14. The said cap or head 14 is provided upon its upper side with a central boss 15 having a reduced end 16 and upon its under side with a tubular portion 16', whose lower end forms a seat 16ª. The cap 14, boss 15 and reduced end 16 are provided with a central opening registering with the opening in the tubular portion 16' to receive loosely a valve stem 18, carrying the valve structure 19 at its lower end comprising a main and a secondary valve.

The casing 10 is provided with a horizontal partition 20, having an opening 21 therein, and a recessed upper edge 22 forming a valve seat for the main valve.

23 denotes a frame which is preferably made rectangular in form, and provided at its lower end with a central opening to receive the reduced end 16 of the boss 15, and to be secured to the head or cap 14 by a nut 24.

The vertical or side members 23ª, 23ᵇ of the frame 23 are each formed of two parallel members 23ᶜ, 23ᶜ arranged in spaced relation, and the side member 23ᵇ is provided intermediate its ends with bearings 25 upon which is pivotally mounted a lever 27 disposed between the vertical members 23ᶜ. The inner end of said lever 27 extends between the members 23ᶜ of the side member 23ª in order to guide said lever in its vertical movements, and the outer end of said lever 27 is provided with an aperture 28 to permit of its attachment to an operating device or mechanism, such as a thermostatic or pressure responsive device.

The movement of the inner end of the lever 27 may be limited by stops 26, 26ª extending through the side members 23ᶜ, 23ᶜ of the frame member 23ª.

The upper end of the valve stem 18 is provided with a transverse pin 29, to which is pivotally connected the end of a link 30, whose outer end is pivotally mounted intermediate the bearings 30ª on the side member 23ᵇ.

32, 33 denote links pivotally connected together at 34, and forming a toggle connection. The link 32 has its upper end pivotally connected to the lever 27 adjacent to its inner end, and the other end of the link 33 is pivotally secured to the link 30 and the end of the valve stem 18.

35 denotes a spring having one end connected to the link 32, and its other end connected to the lever 27 adjacent to its point of support.

The valve structure 19 comprises a main valve adapted to control the passage of fluid through the valve casing 10, and a sealing member termed herein a secondary valve adapted to prevent the leakage of fluid past the valve stem 18, when said main valve is unseated.

The main valve comprises a flanged disk 19$^c$ within which is disposed a valve disk or washer 19$^d$, of fibre, rubber or other suitable material, secured in place by a metal washer 19$^e$, and a nut 19$^f$ engaging the lower screw-threaded end of the valve stem 18.

The secondary valve comprises a centrally disposed boss 20 arranged upon the upper side of the flanged disk 19$^c$, and provided in its upper side with a circular recess to receive a package or wash 20$^a$ which is adapted to seat against the valve seat 16$^a$ at the lower end of the tubular portion 16′ when said main valve is raised from its seat 22.

In order to protect the operating mechanism arranged within the frame 23, the same may be enclosed by a sheet metal casing 40, adapted to be fitted upon said frame and comprising a pair of flat side members 41, connected together at their upper ends by a transverse web.

It is to be noted that my improved valve is peculiarly adapted for use in controlling the supply of gas in a furnace, stove or other apparatus in which the operation of the valve is controlled by an automatic regulating device, and in which it is essential that the valve be opened and closed instantly. In cases of this kind, unless the valve be operative instantly, an accumulation of gas will occur which will produce an explosion as soon as the accumulated gas is mixed with the quantity of air necessary to render the same explosive.

The operation of the valve is as follows:

Assume the valve to be in the position illustrated at Fig. 1, as soon as the pressure or temperature controlled device is actuated, it will draw down the outer end of the lever 27 until the link 30 and toggle connection 32, 33 assume a valve reversing position, and the spring 35 will cause the stem 18 to descend and close the main valve 19$^c$ against its seat 22 with a sudden snap. When the reverse or opening operation of the valve is to be performed, the controlling device will cause the outer end of the lever 27 to rise, and the inner end, within the frame 23, to descend, whereupon the spring 35 will cause the link 33 and link 30 to overcome their dead center and instantly raise the valve stem 18 and unseat the main valve 19, and cause the secondary valve 20 to seat firmly upon its seat 16$^a$ at the lower end of the tubular portion or member 16′, and thereby effectually prevent any leakage of gas past valve stem 18, when said main valve 19$^c$ is unseated.

Having thus described my said invention, what I claim and desire to secure by Letters Patent is:

1. A valve of the character described, comprising a casing, a valve mounted therein, a movable member for operating said valve, and a spring controlled toggle connection pivotally connected at one end to said valve and at the other end to said member for holding said valve normally in either of its operative positions, and for causing said valve to be shifted quickly to the other of its operative positions when said member is actuated to cause said toggle connection to assume a valve reversing position, substantially as specified.

2. A valve of the character described, comprising a casing, a valve reciprocatingly mounted therein, a pivoted member for operating said valve, and a spring controlled toggle connection pivotally connected at one end to said valve and at the other end to said pivoted member for holding said valve normally in either of its operative positions, and for causing said valve to be shifted quickly to the other of its operative positions when said pivoted member is actuated to cause said toggle connection to assume a valve reversing position, substantially as specified.

3. A valve of the character described, comprising a casing, a valve reciprocatingly mounted therein, a lever pivotally mounted upon said valve casing for operating said valve, a toggle connection pivotally connected at one end to said valve and at the other end to said lever, and a spring interposed between said lever and the member of said toggle connection pivotally connected to said lever for holding said valve normally in either of its operative positions, and for causing said valve to be shifted to the other of its operative positions when said lever is actuated to cause said toggle connection to assume a valve reversing position, substantially as specified.

4. A valve of the character described, comprising a casing, a valve reciprocatingly mounted therein, a stem secured to said valve and extending through said casing, a support on said casing, a lever pivotally mounted upon said support, and a spring controlled toggle connection interposed between the outer end of said valve stem and said lever for holding said valve normally in either of its operative positions, and for causing said valve to be shifted to the other of its operative positions when said lever is actuated to cause said toggle connection to assume a valve reversing position, substantially as specified.

5. A valve of the character described, comprising a casing, a valve reciprocatingly mounted therein, a stem secured to said valve and extending through said casing, a support on said casing, a lever pivotally mounted upon said support, a toggle interposed between said lever and the outer end of said stem, and spring means connecting said lever and said toggle, and cooperating therewith for holding said valve normally in either of its operative positions, and for causing said valve to be shifted to the other of its operative positions when said lever is actuated to cause said toggle to assume a valve reversing position, substantially as specified.

6. A valve of the character described comprising a casing, a valve reciprocatingly mounted therein, a stem on said valve extending through said casing, a frame secured to said casing, a lever pivotally mounted on said frame, a link having one end pivotally secured to said frame and its other end operatively engaging the outer end of said valve stem, and a spring controlled toggle connection interposed between said lever and the outer end of said stem for holding said valve normally in either of its operative positions, and for causing said valve to be shifted to the other of its operative positions when said lever is actuated to cause said toggle connection to assume a valve reversing position, substantially as specified.

7. A valve of the character described, comprising a casing, a valve reciprocatingly mounted therein, a stem on said valve extending through said casing, a frame secured to said casing, a lever pivotally mounted on said frame, a link having one end pivotally secured to said frame and its other end operatively engaging the outer end of said valve stem, a toggle connection interposed between said lever and the outer end of said stem, and spring means associated with said lever and said toggle connection and cooperating therewith to hold said valve normally in either of its operative positions and for causing said valve to be shifted to the other of its operative positions when said lever is actuated to cause said link and the toggle connection to assume a valve reversing position, substantially as specified.

8. A valve of the character described comprising a casing, a head secured thereto, a valve arranged within said casing, a stem on said valve extending through said head, a frame secured to said head and enclosing the outer end of said valve stem, a lever pivotally mounted on said frame, means for limiting the movement thereof, a link pivotally secured at one end to said frame and its other end operatively connected to the outer end of said valve stem, a toggle connection interposed between said lever and the outer end of said stem, and a spring connecting said lever and said toggle connection, and cooperating therewith for holding said valve normally in either of its operative positions, and for causing said valve to be shifted to the other of its operative positions when said lever is actuated to cause said link and said toggle connection to assume a valve reversing position, substantially as specified.

Signed at the city of Buffalo, Erie County, in the State of New York, this first day of June, one thousand nine hundred and twenty-one.

LEWIS W. EGGLESTON.